No. 663,022. Patented Dec. 4, 1900.
D. T. GRANBERY.
TRAP FOR GAME, &c.
(Application filed July 26, 1900.)
(No Model.)
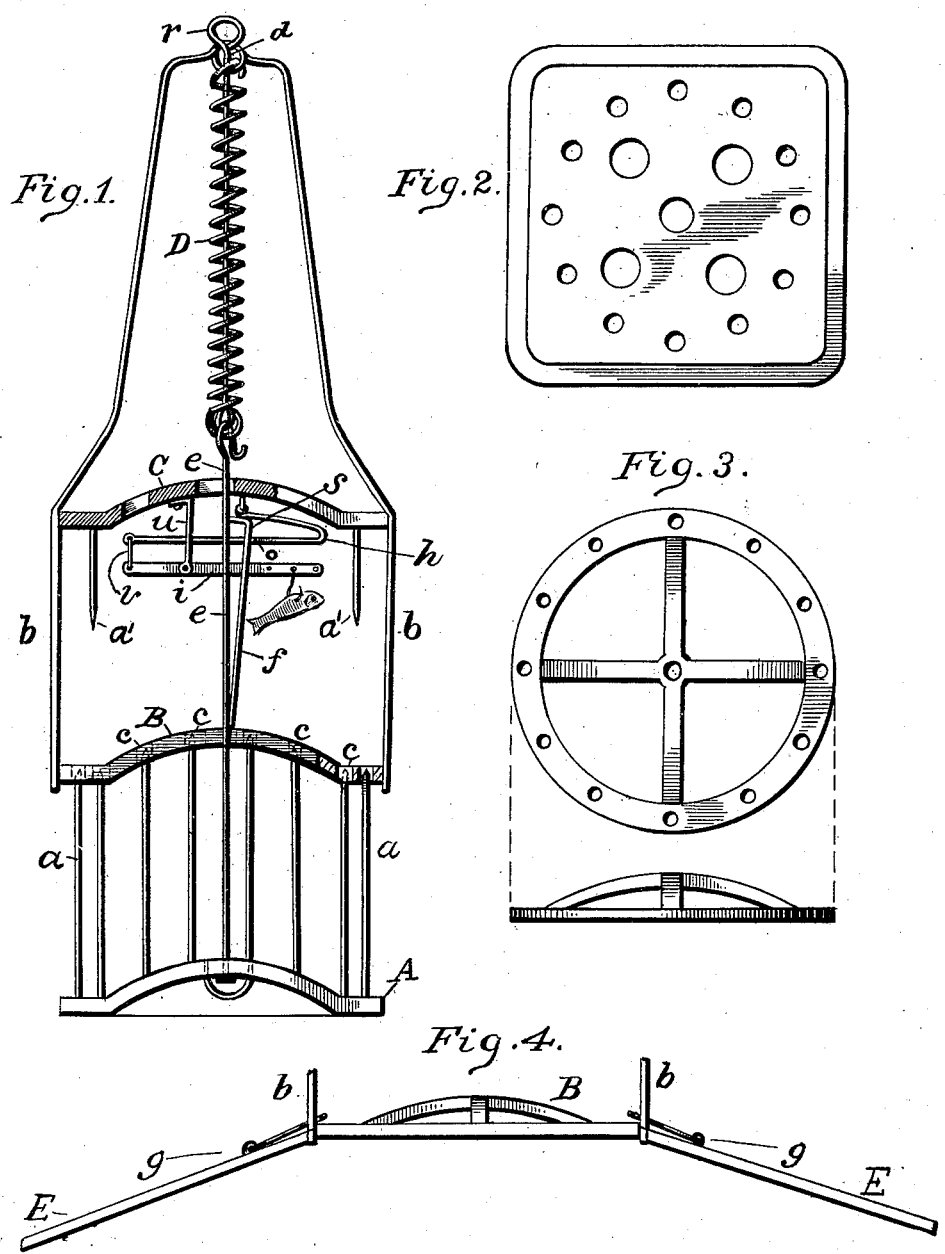

UNITED STATES PATENT OFFICE.

DEE T. GRANBERY, OF MEMPHIS, TENNESSEE.

TRAP FOR GAME, &c.

SPECIFICATION forming part of Letters Patent No. 663,022, dated December 4, 1900.

Application filed July 26, 1900. Serial No. 24,957. (No model.)

*To all whom it may concern:*

Be it known that I, DEE T. GRANBERY, a citizen of the United States, residing at No. 189 Robeson street, in the city of Memphis, in the State of Tennessee, have invented certain new and useful Improvements in Traps for Fish, Game, Rats, and other Animals; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to fishing apparatus and to traps for game and rats; and it consists in certain improvements in the construction of such devices, as hereinafter described and claimed.

In the accompanying drawings, Figure 1 represents a side view of my improved apparatus, showing the device as set for operation. Fig. 2 is a plan view of one form of a perforated plate herein referred to. Fig. 3 shows in plan and edge views another form of the perforated or open-work plates employed. Fig. 4 is an edge view showing a perforated plate with certain attachments.

Referring to the drawings, A designates a perforated or open-work plate or frame which forms the foundation of the device and in operation is the moving plate. Secured to the plate A are the vertical spears $a$, and above said plate is another perforated plate B, having holes $c$ made therein, through which the spears extend when the trap is not set. When the trap is set, the plate A is drawn downward from the plate B, so that the points of said spears are in the holes $c$ in the plate B, as shown in Fig. 1. A suitable distance above the plate B and firmly connected therewith by rods $b$ is another plate C, which forms the top plate of the device. The rods $b$ extend upward from the plate C and are constructed to form a support for a vertical rod $d$ and hold the upper end of a spiral spring D placed on said rod. An eye $r$ is formed on the upper end of the rod $d$ for the attachment of a fish-line when the trap is used in fishing, and said eye also serves to prevent the rod $d$ being drawn down too far.

$e$ indicates a rod which is connected with the lower end of the rod $d$ and also with the spiral spring D, said rod $e$ extending downward through apertures in the plates C and D to the plate A, to which latter the said rod is secured, as shown.

A catch $s$ is formed on the rod $e$ by a supplemental rod $f$, which is fixed at both ends thereto. A metallic strip $h$ is connected with the plate C at a point near the central opening in said plate, from which point said strip extends laterally and is then bent and extends horizontally crosswise of said plate C and has one end connected by a short connecting-rod $v$ with one end of a horizontal trigger $i$, pivotally connected with an arm $u$, secured to the plate C.

A shoulder $o$ is formed on the strip $h$ as a bearing for the supplemental rod $f$.

The bait may be connected with the trigger $i$ at its free end in any suitable manner.

Spears $a'$ extend down from the top plate C, as shown.

The several plates may be constructed of wood or metal and are made bulging upward, as seen in Fig. 1. They are open-work, so that when the device is attached to a fish-line it may be more readily drawn out of the water. In Fig. 3 is shown a form of plate consisting of a rim and four radial bars extending from the center of the plate to said rim. Four or more radial bars are employed in this form of plate.

When the device is to be set standing on a floor for catching rats, the plate A is drawn downward from plate B until the catch $s$ on the rod $e$ connects with the strip and the spears $a$ are in the relative position shown in Fig. 1 in the same manner as when the device is set for fishing. Two inclined planes E, provided with hooks $g$, are then connected with the plate B, as shown in Fig. 4, and these serve to enable the rat to readily approach the bait, and as the animal pulls at the bait the rod $e$ is released by the action of the trigger and the strip $h$ and is instantly drawn upward by the spring D, bringing up the plate A and the spears $a$, by which the rat is caught.

I claim—

1. In a trap for fish and other animals, a plate having a series of spears mounted thereon, a perforated plate in position to admit said spears through its perforations, a plate located above said perforated plate and firmly connected therewith, a central, vertical rod and a retracting-spring, supported above the last-mentioned plate, another central rod connected with the first-mentioned rod and also with the retracting-spring and with the said plate which carries the spears, a catch secured to the last-mentioned rod, a pivoted trigger and devices connected therewith adapted to connect with said catch and also to release said rod to which said catch is secured, substantially as and for the purposes described.

2. The combination with a top plate and a perforated plate, firmly connected by rods with said top plate, of a vertical, central rod and a retracting-spring thereon, supported above said top plate, another rod e, provided with a catch and connected with the first-mentioned rod and spring, a pivotally-mounted trigger connected with a support carried by said top plate, a metallic strip loosely connected with said top plate and with said trigger and adapted to connect with catch and also to release said rod e on a movement of said trigger substantially as set forth and described.

In testimony whereof I affix my signature in presence of two witnesses.

DEE T. GRANBERY.

Witnesses:
GUY W. MOORE,
S. L. MOORE.